UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

GREENISH-BLUE DYE.

SPECIFICATION forming part of Letters Patent No. 437,989, dated October 7, 1890.

Application filed May 20, 1889. Serial No. 311,471. (Specimens.)

*To all whom it may concern:*

Be it known that I, ALBERT HERRMANN, doctor of philosophy, a citizen of the Empire of Germany, residing at Höchst-on-the-Main, in the Empire of Germany, have invented certain new and useful Improvements in Green-Blue Coloring-Matter; and I do hereby declare the following to be a full, clear, and exact description of the invention, such as will enable others skilled in the art to which it appertains to make and use the same.

My present invention relates to the production of an improved coloring-matter of an intense green-blue shade, which is the sulphonic acid of methylated and ethylated meta-amidotetralkyldiamidotriphenyl carbinol. The methylated and ethylated leuco bases corresponding to this sulphonated color are obtained by treatment of meta-amidotetralkyldiamidotriphenyl methane with methyl or ethyl halogens. (*E. & O. Fischer, Berichte der deutschen chemischen Gesellschaft* XII, 802, and XIII, 673.) By employing a larger or smaller quantity of alkyl halogen—such as methyl-chloride bromide iodide and ethyl-chloride bromide iodide—there may be obtained monomethylated (monoethylated)

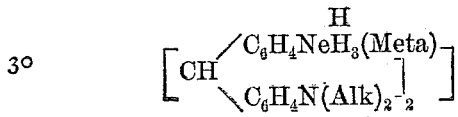

or dimethylated (diethylated)

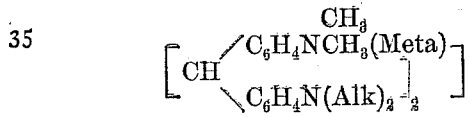

meta-amidotetralkyldiamidotriphenyl methanes.

The leuco base by treatment with sulphuric acid or fuming sulphuric acid is converted into sulphonic acid, which by oxidation with peroxides—such as manganese peroxide, lead peroxide, barium peroxide—furnishes solid green-blue acid coloring-matter. The same acid coloring-matter can be obtained also by the action of sulphuric acid upon methylated or ethylated meta-amidotetralkyldiamidotriphenyl carbinol. The coloring-matter is produced in the following manner, viz: Ten parts, by weight, of the calcium salt of the sulphonic acid, prepared from dimethyl meta-amidotetralkyldiamidotriphenyl methane, are dissolved in about three hundred parts, by weight, of water. There is then added the calculated quantities of diluted sulphuric acid and peroxide of lead. It is then filtered off from the precipitated sulphate of lead, and the blue solution of coloring-matter is evaporated to dryness. In this manner I produce it: The sulphonic acid (and the salts thereof) of monomethylmeta-amidotetramethyldiamidotriphenyl methane, monoethylmeta-amidotetramethyldiamidotriphenyl methane, dimethyl meta-amidotetramethyldiamidotriphenyl methane, diethylmeta-amidotetramethyldiamidotriphenyl methane, monomethylmeta-amidotetraethyldiamidotriphenyl methane, monoethylmeta-amidotetraethyldiamidotriphenyl methane, dimethylmeta-amidotetraethyldiamidotriphenyl methane, diethylmeta-amidotetraethyldiamidotriphenyl methane, monomethylmeta-amidodimethyldiethyldiamidotriphenyl methane, symmetric

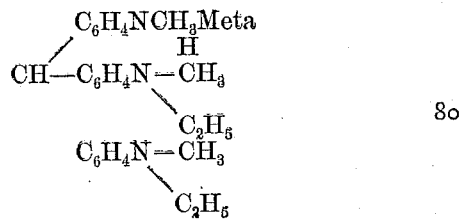

monomethylmeta-amidodimethyldiethyldiamidotriphenyl methane non-symmetric,

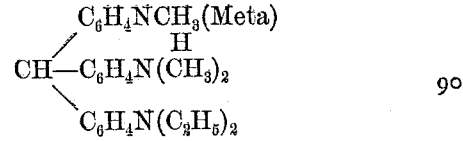

monoethylmeta-amidodimethyldiethyldiamidotriphenyl methane symmetric, monoethylmeta-amidodimethyldiethyldiamidotriphenyl methane non-symmetric, dimethylmeta-amidodimethyldiethyldiamidotriphenyl methane symmetric, dimethylmeta-amidodimethyldiethyldiamidotriphenyl methane non-symmetric, diethylmeta-amidodimethyldiethyldiamidotriphenyl methane symmetric, diethylmeta-amidodimethyldiethyldiamidotriphenyl methane non-symmetric, monomethylmeta-amidodimethyldibenzyldiamidotriphenyl methane, monoethylmeta-amidodimethyldibenzyldiamidotriphenyl methane, dimethylmeta-amidodimethyldibenzyldiamidotriphenyl methane, diethylmeta-amidodiethyldibenzyldiamidotriphenyl methane, monomethylmeta-amidodiethyldibenzyldiamidotriphenyl methane, monoethylmeta-amidodiethyldibenzyldiamidotriphenyl methane, dimethylmeta-amidodiethyldibenzyldiamidotriphenyl methane, diethylmeta-amidodiethyldibenzyldiamidotriphenyl methane, (process I of the application referred to before.)

The new coloring-matter is in the form of a copper-red powder, with metallic luster, easily soluble in water. The physical and chemical comportment is the same as that of the sulphonic acid of the meta-amidotetralkyldiamidotriphenyl carbinol.

Having thus described my invention, what I claim as new, and desire to secure by Letters Patent, is—

A new green-blue coloring-matter in the form of a copper-red powder with metallic luster, the sulphonic acid of methylated and ethylated meta-amidotetralkyldiamidotriphenyl carbinol, easily soluble in water, as set forth.

In testimony whereof I affix my signature in presence of two witnesses.

ALBERT HERRMANN.

Witnesses:
JOSEPH REVERDY,
HEINRICH HAHN.